US012630208B2

(12) United States Patent
Zhu

(10) Patent No.: US 12,630,208 B2
(45) Date of Patent: May 19, 2026

(54) STROLLER

(71) Applicant: Wonderland Switzerland AG, Steinhausen (CH)

(72) Inventor: Wanquan Zhu, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 330 days.

(21) Appl. No.: 18/570,849

(22) PCT Filed: Jun. 15, 2022

(86) PCT No.: PCT/EP2022/066420
§ 371 (c)(1),
(2) Date: Dec. 15, 2023

(87) PCT Pub. No.: WO2022/263571
PCT Pub. Date: Dec. 22, 2022

(65) Prior Publication Data
US 2024/0308567 A1      Sep. 19, 2024

(30) Foreign Application Priority Data

Jun. 16, 2021    (CN) ......................... 202110664154.0

(51) Int. Cl.
B62B 7/14              (2006.01)
(52) U.S. Cl.
CPC ................................... B62B 7/142 (2013.01)
(58) Field of Classification Search
CPC ........... B62B 7/142; B62B 7/14; B62B 7/145;
B62B 7/147; B62B 9/10; B62B 9/102;
B62B 9/104; B62B 9/12; B62B 2205/20
See application file for complete search history.

(56) References Cited

U.S. PATENT DOCUMENTS

| | | | |
|---|---|---|---|
| 7,338,122 B2 * | 3/2008 | Hei ...................... | B60N 2/2821 |
| | | | 297/256.12 |
| 7,364,183 B2 * | 4/2008 | Lee ......................... | B62B 7/142 |
| | | | 280/47.38 |
| 8,511,749 B2 * | 8/2013 | Hei ...................... | B60N 2/2806 |
| | | | 297/130 |
| 10,994,764 B2 * | 5/2021 | Yang ...................... | B62B 7/145 |

(Continued)

FOREIGN PATENT DOCUMENTS

| | | |
|---|---|---|
| CN | 201183515 Y | 1/2009 |
| CN | 101670797 A | 3/2010 |

(Continued)

OTHER PUBLICATIONS

International Search Report and Written Opinion for Application No. PCT/EP2022/066420 dated Oct. 4, 2022.

*Primary Examiner* — John D Walters
(74) *Attorney, Agent, or Firm* — Volpe Koenig

(57)        ABSTRACT

A stroller includes a frame, a seat fixing base and a seat. The seat fixing base is disposed on the frame. The seat fixing base has an engaging structure. The seat includes an unlock button and a plurality of engaging members. The unlock button abuts against the engaging members. The engaging members engage with the engaging structure to restrain the seat on the seat fixing base. When the unlock button is pressed, the unlock button drives the engaging members to disengage from the engaging structure, such that the seat is able to be detached from the seat fixing base.

10 Claims, 9 Drawing Sheets

(56)        References Cited

U.S. PATENT DOCUMENTS 11,059,510 B2 *    7/2021   Eyman ...................... B62B 7/08
2005/0025343 A1    2/2005   Zhang et al.
2012/0267925 A1    10/2012  Hei et al.

FOREIGN PATENT DOCUMENTS

| | | | |
|----|----|----|----|
| CN | 102219026 | B | 2/2013 |
| CN | 105501282 | A | 4/2016 |
| CN | 108068871 | A | 5/2018 |
| CN | 207292106 | U | 5/2018 |
| CN | 111409688 | A | 7/2020 |
| CN | 211893372 | U | 11/2020 |
| CN | 212980325 | U | 4/2021 |
| CN | 213008318 | U | 4/2021 |
| CN | 112810688 | A | 5/2021 |
| DE | 102014114413 | B3 | 2/2016 |
| DE | 202019105127 | U1 | 12/2020 |
| EP | 2727498 | B1 | 6/2016 |
| EP | 3626577 | A1 | 3/2020 |
| TW | M530264 | U | 10/2016 |
| WO | 2018022893 | A1 | 2/2018 |

* cited by examiner

STROLLER

CROSS-REFERENCE TO RELATED APPLICATIONS

This application is a National Stage application of PCT/EP2022/066420, filed on Jun. 15, 2022, which claims the benefit of Chinese Application No. 202110664154.0, filed on Jun. 16, 2021 both of which are incorporated herein by reference in their entirety.

FIELD OF THE INVENTION

The present invention relates to a stroller, particularly a stroller with a seat capable of being detached conveniently.

BACKGROUND OF THE INVENTION

A stroller is a tool used by parents to carry babies or children when they go shopping. In general, a seat of a conventional stroller is detachable to facilitate storage or transportation. However, a detachable structure of the conventional seat is complicated and a user usually needs to use both hands to remove the seat.

SUMMARY OF THE INVENTION

The present invention aims at providing a stroller with a seat capable of being detached conveniently, thereby resolving the aforesaid problems.

This is achieved by a stroller according to claim 1. The dependent claims pertain to corresponding further developments and improvements.

As will be seen more clearly from the detailed description following below, the claimed stroller includes a frame, a seat fixing base and a seat. The seat fixing base is disposed on the frame. The seat fixing base has an engaging structure. The seat includes an unlock button and a plurality of engaging members. The unlock button abuts against the engaging members. The engaging members engage with the engaging structure to restrain the seat on the seat fixing base. When the unlock button is pressed, the unlock button drives the engaging members to disengage from the engaging structure, such that the seat is able to be detached from the seat fixing base.

Preferably, the engaging structure is a ring-shaped recess and the engaging members engage with the ring-shaped recess to rotatably restrain the seat on the seat fixing base.

Preferably, the seat further includes a plurality of first elastic members and a pillar, the engaging members surround the pillar, and opposite ends of each of the first elastic members abut against a corresponding one of the engaging members and the pillar respectively.

Preferably, the seat fixing base has a protrusion and the pillar has a groove. When the seat is disposed on the seat fixing base, the protrusion is inserted into the groove.

Preferably, the unlock button has a guiding groove, the pillar has a guiding portion, and the guiding portion is inserted into the guiding groove.

Preferably, the unlock button has a first inclined surface, each of the engaging members has a second inclined surface, and the first inclined surface abuts against the second inclined surface of each of the engaging members. When the unlock button is pressed, the first inclined surface pushes the second inclined surface of each of the engaging members to drive each of the engaging members to disengage from the engaging structure.

Preferably, the seat fixing base has two positioning recesses and the seat further includes a positioning member. When the positioning member engages with one of the two positioning recesses, the seat faces a front direction of the stroller. When the positioning member engages with the other one of the two positioning recesses, the seat faces a rear direction of the stroller.

Preferably, the seat further includes a second elastic member and opposite ends of the second elastic member abut against the positioning member and the seat.

Preferably, the seat further includes a webbing and the webbing is disposed on an upper surface of the seat.

Preferably, a moving direction of each of the engaging members is perpendicular to a pressing direction of the unlock button.

As mentioned in the above, the frame of the invention is equipped with the seat fixing base with the engaging structure. When the engaging members of the seat engage with the engaging structure of the seat fixing base, the seat is restrained on the seat fixing base. To detach the seat, a user may press the unlock button by one hand. When the unlock button is pressed, the unlock button drives the engaging members to disengage from the engaging structure, such that the seat is able to be detached from the seat fixing base. Furthermore, the invention may dispose the webbing on the upper surface of the seat. To detach the seat, the user may press the unlock button of the seat by a thumb and pull the webbing upward by other fingers, so as to detach the seat from the seat fixing base. Accordingly, the user may detach the seat by one hand. The operation is convenient and the structure is simple.

BRIEF DESCRIPTION OF THE DRAWINGS

In the following, the invention is further illustrated by way of example, taking reference to the accompanying drawings thereof.

DETAILED DESCRIPTION

Figure 1:
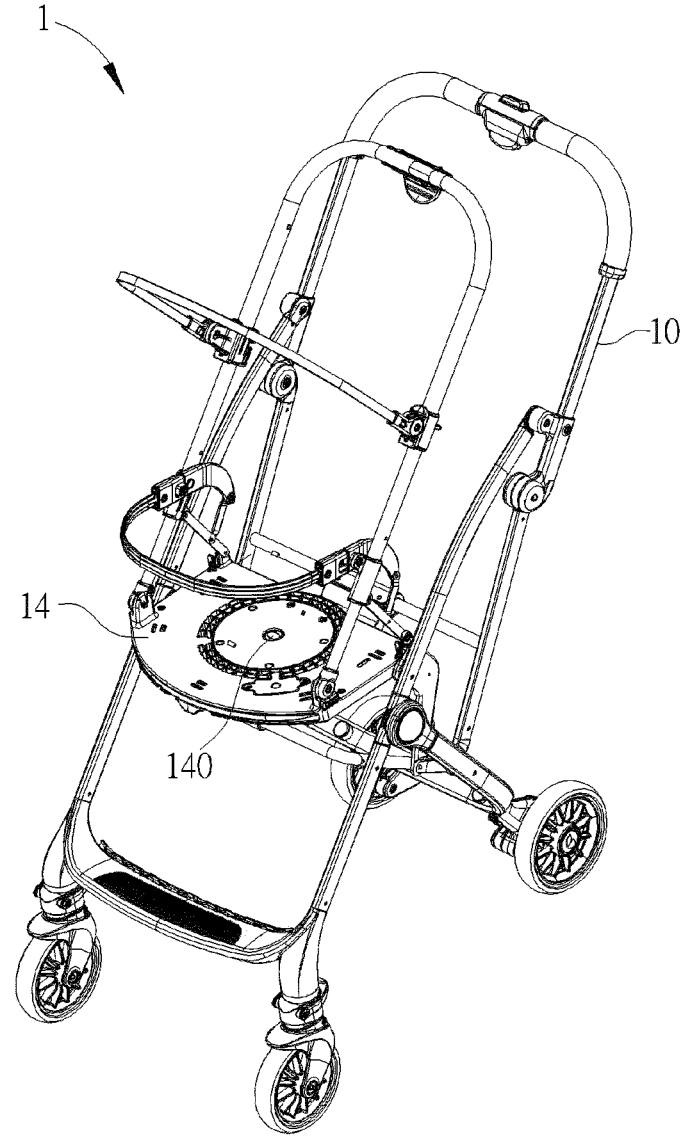
FIG. 1 is a perspective view illustrating a stroller according to an embodiment of the invention.
Figure 2:
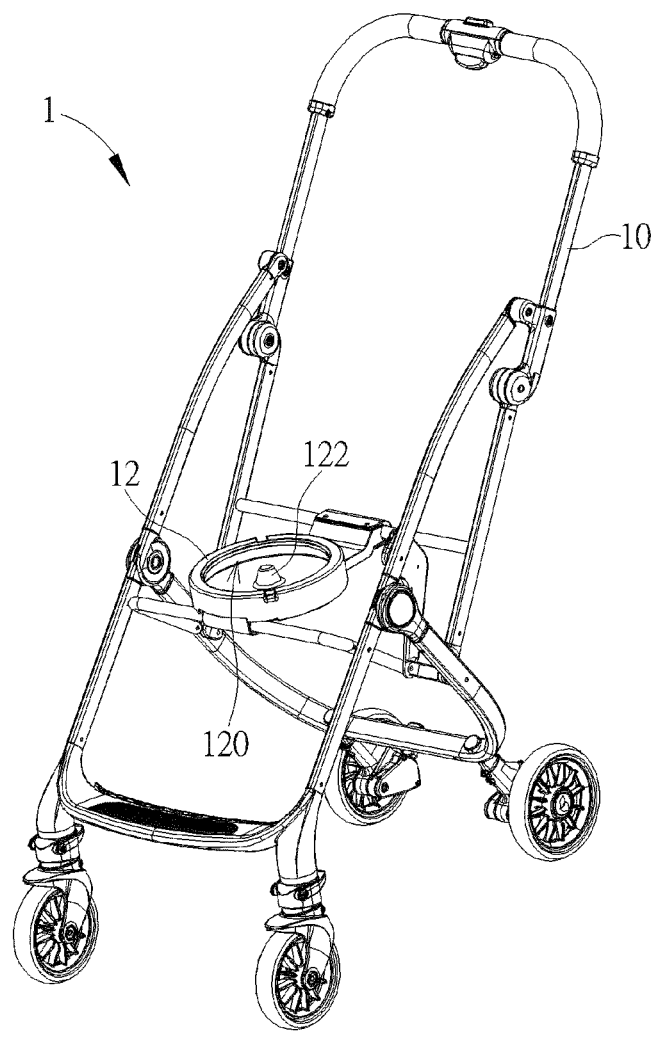
FIG. 2 is a perspective view illustrating the stroller shown in FIG. 1 without a seat.
Figure 3:
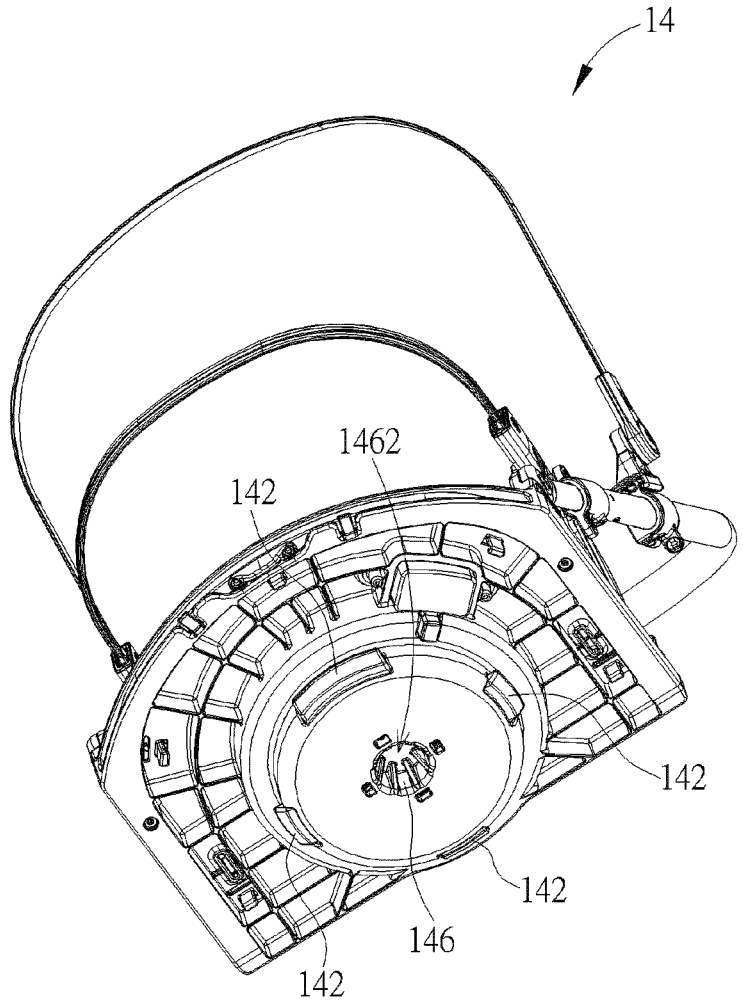
FIG. 3 is a perspective view illustrating the seat shown in FIG. 1 from another viewing angle.
Figure 4:
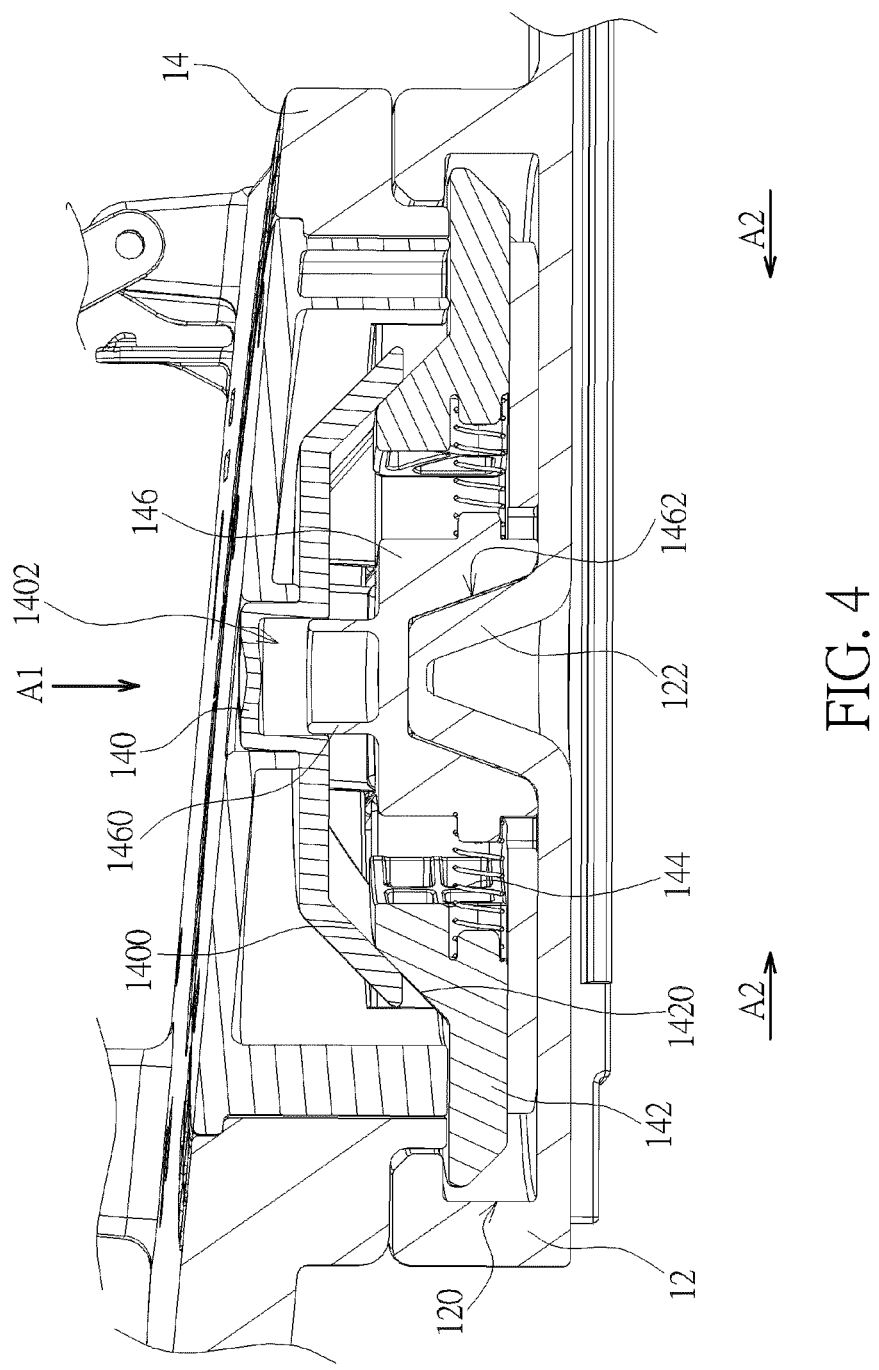
FIG. 4 is a sectional view illustrating an assembly of the seat and a seat fixing base.

Referring to FIGS. 1 to 4, FIG. 1 is a perspective view illustrating a stroller 1 according to an embodiment of the invention, FIG. 2 is a perspective view illustrating the stroller 1 shown in FIG. 1 without a seat 14, FIG. 3 is a perspective view illustrating the seat 14 shown in FIG. 1 from another viewing angle, and FIG. 4 is a sectional view illustrating an assembly of the seat 14 and a seat fixing base 12.

As shown in FIGS. 1 and 2, the stroller 1 includes a frame 10, a seat fixing base 12 and a seat 14. The seat fixing base 12 is disposed on the frame 10 and the seat 14 is detachably disposed on the seat fixing base 12. As shown in FIGS. 2 and 4, the seat fixing base 12 has an engaging structure 120. As shown in FIGS. 1, 3 and 4, the seat 14 includes an unlock button 140 and a plurality of engaging members 142, wherein the unlock button 140 abuts against the engaging members 142. In this embodiment, the seat 14 may include four engaging members 142, but the invention is not so limited. The number of the engaging members 142 may be determined according to practical applications.

As shown in FIG. 4, when the seat 14 is disposed on the seat fixing base 12, the engaging members 142 engage with the engaging structure 120 to restrain the seat 14 on the seat fixing base 12. When a user wants to detach the seat 14, the user may press the unlock button 140 in a direction of an arrow A1. When the unlock button 140 is pressed, the unlock button 140 drives the engaging members 142 to move in a direction of an arrow A2. At this time, the engaging members 142 disengage from the engaging structure 120, such that the seat 14 is able to be detached from the seat fixing base 12. In this embodiment, a moving direction of each of the engaging members 142 (i.e. the direction of the arrow A2) is perpendicular to a pressing direction of the unlock button 140 (i.e. the direction of the arrow A1), but the invention is not so limited.

As shown in FIG. 2, the engaging structure 120 of the seat fixing base 12 is a ring-shaped recess. Thus, the engaging members 142 engage with the ring-shaped recess (i.e. the engaging structure 120) to rotatably restrain the seat 14 on the seat fixing base 12. For further explanation, the engaging members 142 may freely move within the ring-shaped recess, such that the seat 14 may rotate 360 degrees with respect to the seat fixing base 12. At the same time, since the engaging members 142 engage with the engaging structure 120, the seat 14 is restrained on the seat fixing base 12 while rotating, such that the seat 14 will rotate more stable.

As shown in FIG. 4, the seat 14 may further include a plurality of first elastic members 144 and a pillar 146. As shown in FIG. 3, the engaging members 142 surround the pillar 146. As shown in FIG. 4, opposite ends of each of the first elastic members 144 abut against a corresponding one of the engaging members 142 and the pillar 146 respectively. When the unlock button 140 is pressed to drive the engaging members 142 to move in the direction of the arrow A2, each of the engaging members 142 compresses the first elastic member 144. When the unlock button 140 is released, an elastic force generated by the first elastic member 144 pushes the engaging member 142, such that the engaging member 142 returns in a reversed direction of the arrow A2. At the same time, the engaging member 142 pushes the unlock button 140, such that the unlock button 140 returns in a reversed direction of the arrow A1.

As shown in FIG. 4, the unlock button 140 may have a first inclined surface 1400 and each of the engaging members 142 may have a second inclined surface 1420, wherein the first inclined surface 1400 abuts against the second inclined surface 1420 of each of the engaging members 142. Thus, when the unlock button 140 is pressed, the first inclined surface 1400 of the unlock button 140 pushes the second inclined surface 1420 of each of the engaging members 142, so as to drive each of the engaging members 142 to move in the direction of the arrow A2 to disengage from the engaging structure 120 of the seat fixing base 12. When the unlock button 140 is released, the second inclined surface 1420 of each of the engaging members 142 pushes the first inclined surface 1400 of the unlock button 140, such that the unlock button 140 returns in the direction of the arrow A1.

As shown in FIG. 4, an inner side of the unlock button 140 may have a guiding groove 1402 and a top of the pillar 146 may have a guiding portion 1460. The guiding portion 1460 is inserted into the guiding groove 1402, such that the unlock button 140 may keep moving linearly with respect to the pillar 146.

As shown in FIGS. 2 to 4, the seat fixing base 12 may have a protrusion 122 and an outer side of the pillar 146 of the seat 14 may have a groove 1462. A user may align the groove 1462 of the seat 14 with the protrusion 122 of the seat fixing base 12 to dispose the seat 14 on the seat fixing base 12. When the seat 14 is disposed on the seat fixing base 12, the protrusion 122 is inserted into the groove 1462. Thus, the user may align the seat 14 with the seat fixing base 12 by the cooperation between the protrusion 122 and the groove 1462, so as to facilitate the installation of the seat 14.

Figure 5:
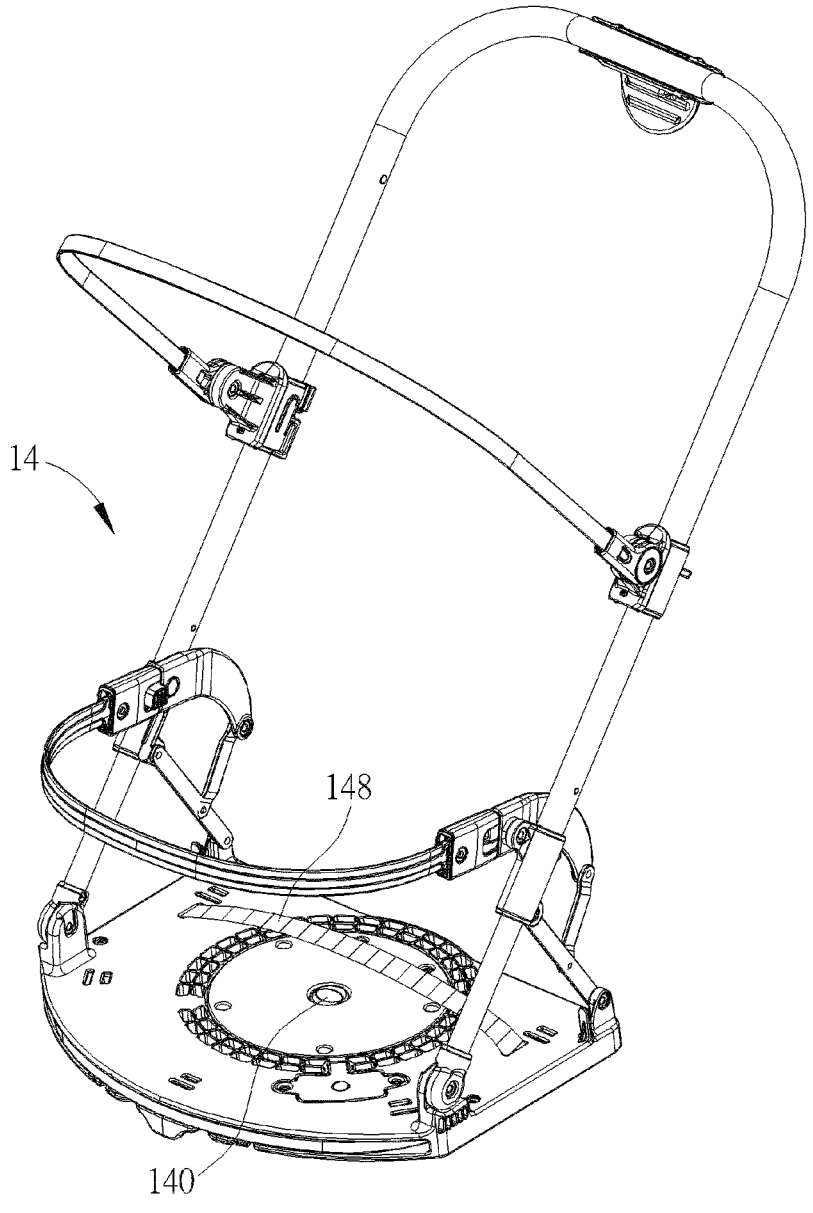
FIG. 5 is a perspective view illustrating the seat according to another embodiment of the invention.

Referring to FIG. 5, FIG. 5 is a perspective view illustrating the seat 14 according to another embodiment of the invention. As shown in FIG. 5, the seat 14 may further include a webbing 148, wherein the webbing 148 is disposed on an upper surface of the seat 14. To detach the seat 14, the user may press the unlock button 140 of the seat 14 by a thumb and pull the webbing 148 upward by other fingers, so as to detach the seat 14 from the aforesaid seat fixing base 12. Accordingly, the user may detach the seat 14 by one hand. The operation is convenient and the structure is simple.

Figure 6:
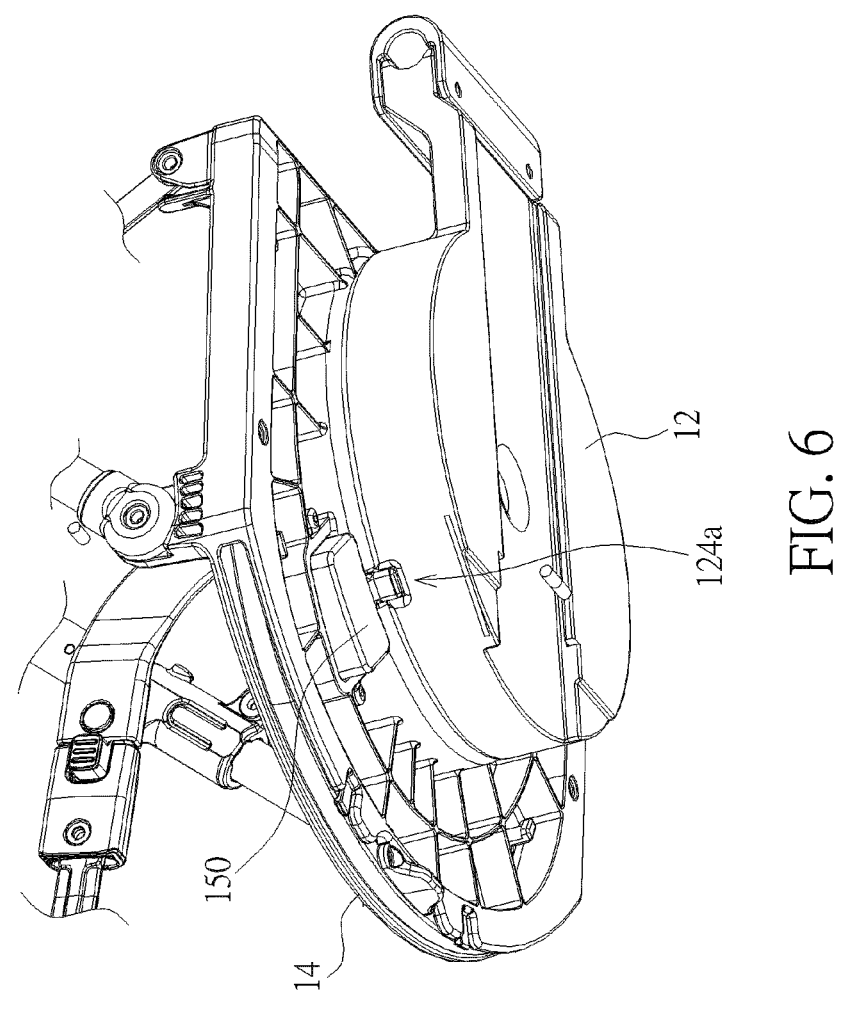
FIG. 6 is a perspective view illustrating the assembly of the seat and the seat fixing base from another viewing angle.
Figure 7:
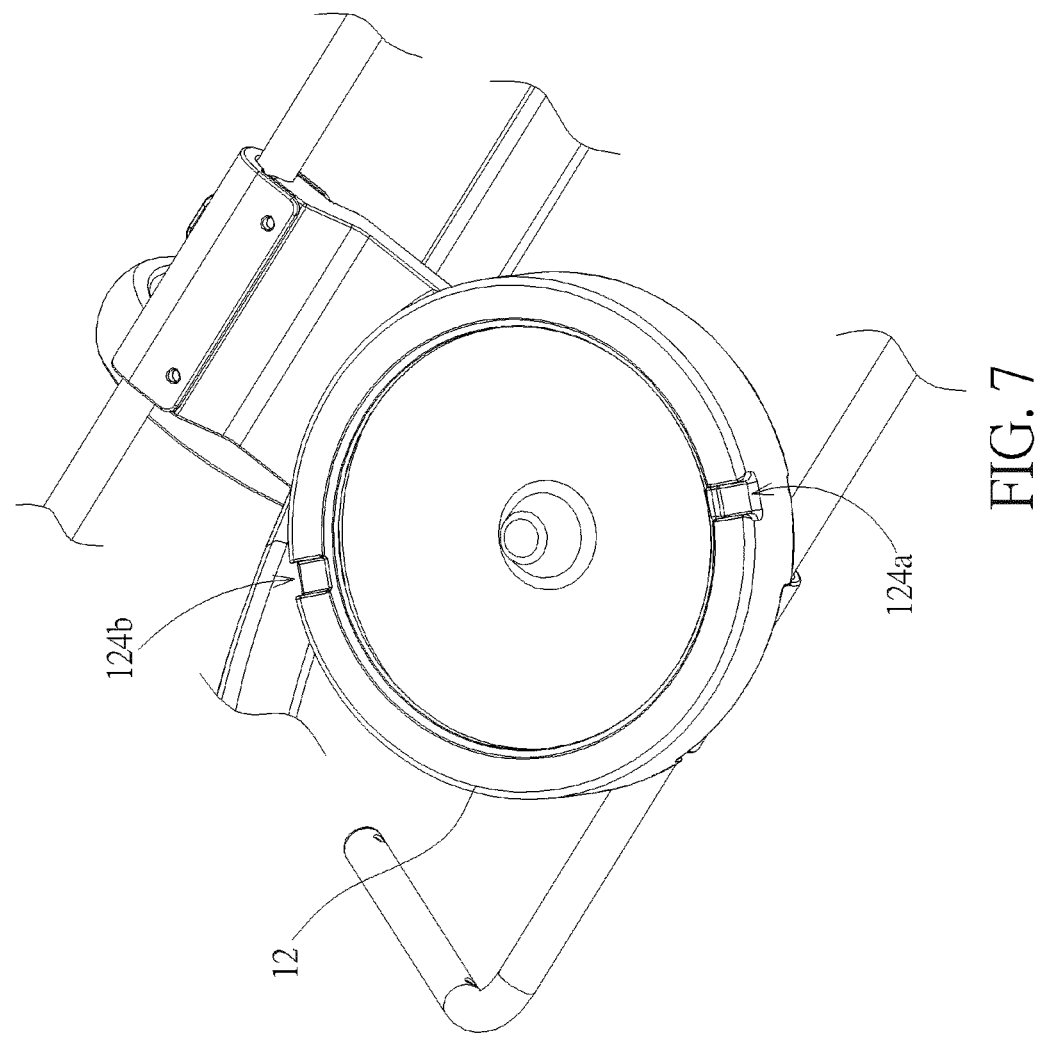
FIG. 7 is a perspective view illustrating the seat fixing base.
Figure 8:
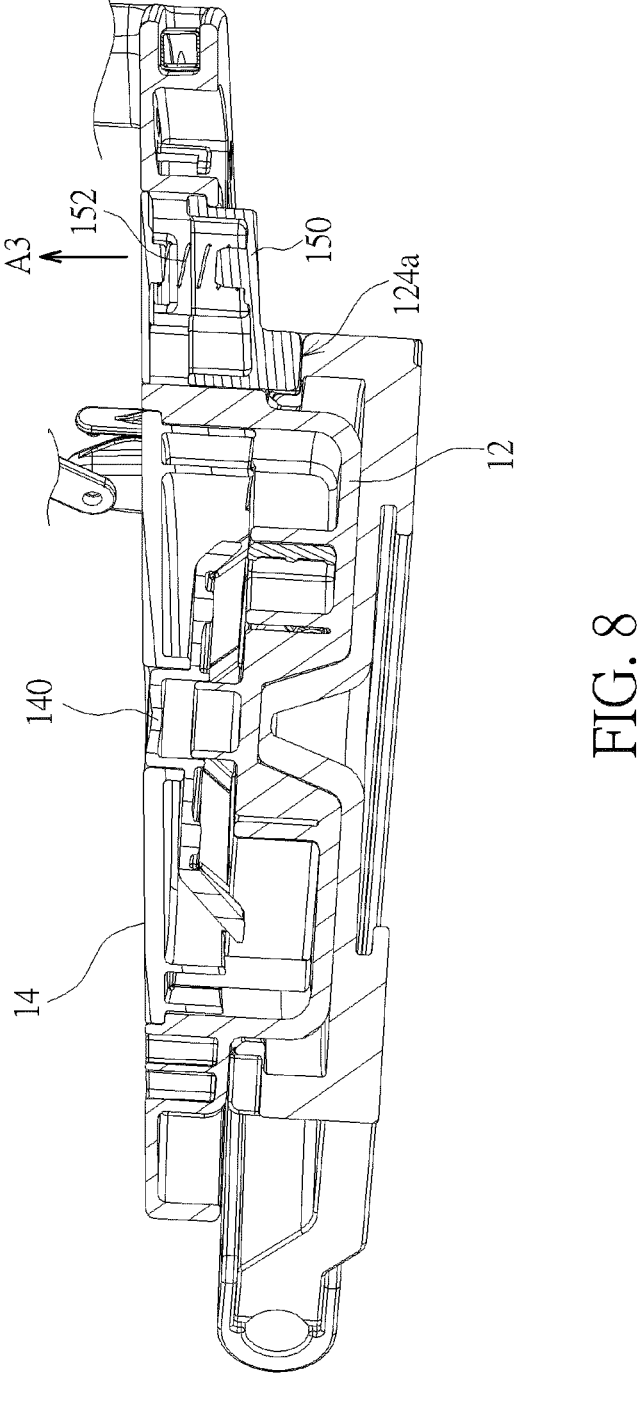
FIG. 8 is a sectional view illustrating the assembly of the seat and the seat fixing base.
Figure 9:
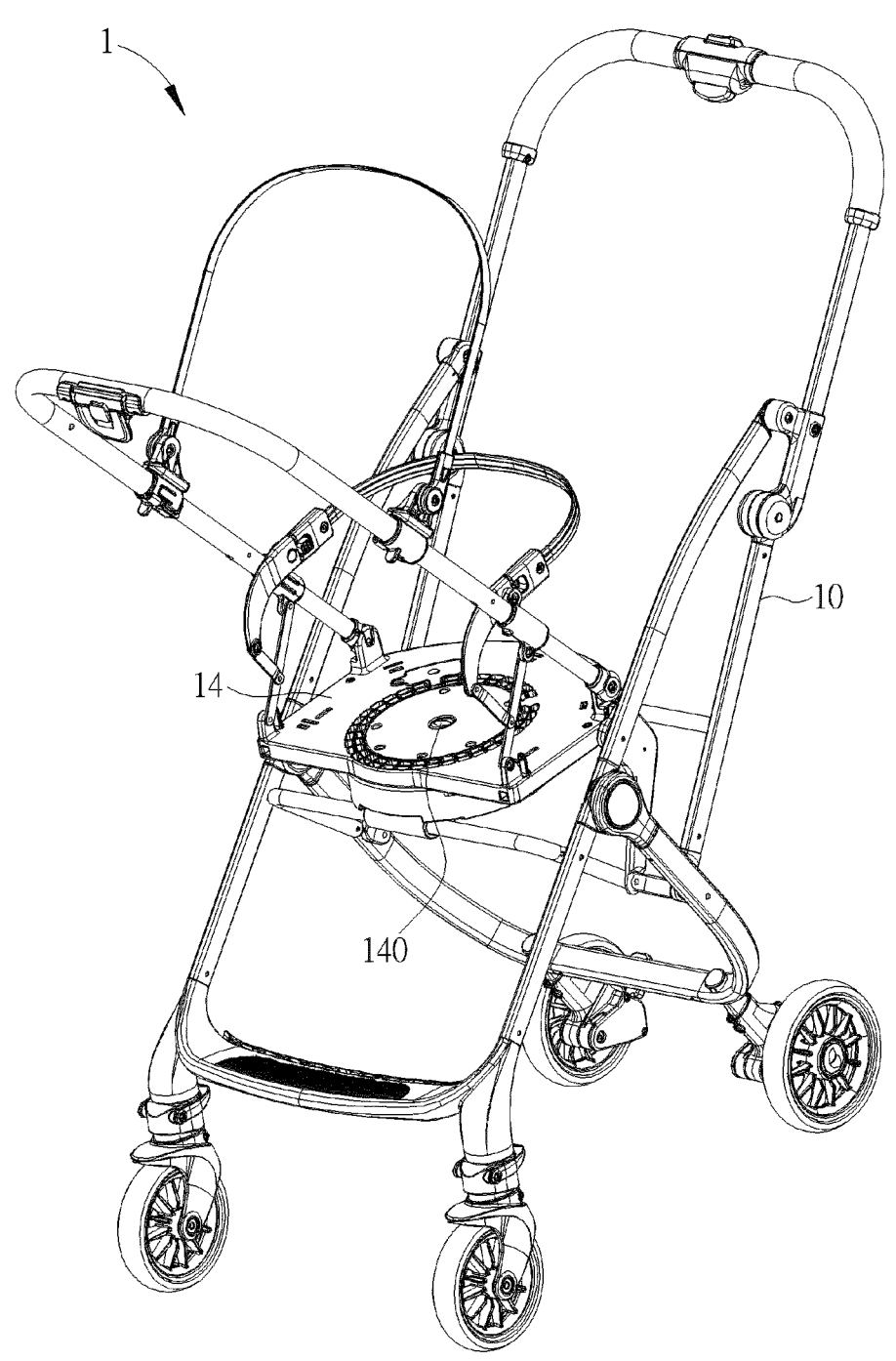
FIG. 9 is a perspective view illustrating the seat facing a rear direction of the stroller.

Referring to FIGS. 6 to 9, FIG. 6 is a perspective view illustrating the assembly of the seat 14 and the seat fixing base 12 from another viewing angle, FIG. 7 is a perspective view illustrating the seat fixing base 12, FIG. 8 is a sectional view illustrating the assembly of the seat 14 and the seat fixing base 12, and FIG. 9 is a perspective view illustrating the seat 14 facing a rear direction of the stroller 1.

As shown in FIGS. 6 to 8, the seat fixing base 12 may have two positioning recesses 124a, 124b, and the seat 14 may further include a positioning member 150 and a second elastic member 152. The positioning member 150 is disposed on a bottom of the base 14. Opposite ends of the second elastic member 152 abut against the positioning member 150 and the seat 14. When the positioning member 150 engages with one of the two positioning recesses 124a, 124b, the seat 14 faces a front direction of the stroller 1 (as shown in FIG. 1). When the positioning member 150 engages with the other one of the two positioning recesses 124a, 124b, the seat 14 faces a rear direction of the stroller 1 (as shown in FIG. 9). In other words, the positioning member 150 is configured to cooperate with the two positioning recesses 124a, 124b to orient the seat 14 to face the front direction of the stroller 1 or orient the seat 14 to face the rear direction of the stroller 1. In this embodiment, when the positioning member 150 engages with the positioning recess 124a, the seat 14 faces the front direction of the stroller 1. When the positioning member 150 engages with the positioning recess 124b, the seat 14 faces the rear direction of the stroller 1. It should be noted that the invention may adjust the positions of the two positioning recesses 124a, 124b to orient the seat 14 to face other directions of the stroller 1, e.g. orient the seat 14 to face a left direction of the stroller 1 or orient the seat 14 to face a right direction of the stroller 1. Needless to say, in addition to the two positioning recesses 124a, 124b, the invention may further add other positioning recesses to the seat fixing base 12, such that the seat 14 may face more different directions of the stroller 1.

As shown in FIG. 8, the positioning member 150 engages with the positioning recess 124*a*, such that the seat 14 cannot rotate with respect to the seat fixing base 12. The user may press the positioning member 150 in a direction of an arrow A3, such that the positioning member 150 disengages from the positioning recess 124*a*. At this time, the user may rotate the seat 14 to adjust an orientation of the seat 14. When the positioning member 150 is pressed to move in the direction of the arrow A3, the positioning member 150 compresses the second elastic member 152. When the positioning member 150 is released and the positioning member 150 is aligned with the positioning recess 124*a* or 124*b*, an elastic force generated by the second elastic member 152 pushes the positioning member 150, such that the positioning member 150 returns in a reversed direction of the arrow A3 and then the positioning member 150 engages with the positioning recess 124*a* or 124*b*.

As mentioned in the above, the frame of the invention is equipped with the seat fixing base with the engaging structure. When the engaging members of the seat engage with the engaging structure of the seat fixing base, the seat is restrained on the seat fixing base. To detach the seat, a user may press the unlock button by one hand. When the unlock button is pressed, the unlock button drives the engaging members to disengage from the engaging structure, such that the seat is able to be detached from the seat fixing base. Furthermore, the invention may dispose the webbing on the upper surface of the seat. To detach the seat, the user may press the unlock button of the seat by a thumb and pull the webbing upward by other fingers, so as to detach the seat from the seat fixing base. Accordingly, the user may detach the seat by one hand. The operation is convenient and the structure is simple.

The foregoing are only preferred embodiments of the invention while the protection scope thereof is not limited to the above description. Any change or substitution within the technical scope disclosed by the invention should be covered by the protection scope of the invention.

The invention claimed is:

1. A stroller, comprising:
   a frame;
   a seat fixing base disposed on the frame, the seat fixing base having an engaging structure; and
   a seat comprising an unlock button and a plurality of engaging members, the unlock button abutting against the engaging members;

wherein the engaging members engage with the engaging structure to restrain the seat on the seat fixing base; when the unlock button is pressed, the unlock button drives the engaging members to disengage from the engaging structure, such that the seat is able to be detached from the seat fixing base.

2. The stroller of claim 1, wherein the engaging structure is a ring-shaped recess and the engaging members engage with the ring-shaped recess to rotatably restrain the seat on the seat fixing base.

3. The stroller of claim 1, wherein the seat further comprises a plurality of first elastic members and a pillar, the engaging members surround the pillar, and opposite ends of each of the first elastic members abut against a corresponding one of the engaging members and the pillar, respectively.

4. The stroller of claim 3, wherein the seat fixing base has a protrusion and the pillar has a groove; wherein, when the seat is disposed on the seat fixing base, the protrusion is inserted into the groove.

5. The stroller of claim 3, wherein the unlock button has a guiding groove, the pillar has a guiding portion, and the guiding portion is inserted into the guiding groove.

6. The stroller of claim 1, wherein the unlock button has a first inclined surface, each of the engaging members has a second inclined surface, and the first inclined surface abuts against the second inclined surface of each of the engaging members; wherein, when the unlock button is pressed, the first inclined surface pushes the second inclined surface of each of the engaging members to drive each of the engaging members to disengage from the engaging structure.

7. The stroller of claim 1, wherein the seat fixing base has two positioning recesses and the seat further comprises a positioning member; wherein, when the positioning member engages with one of the two positioning recesses, the seat faces a front direction of the stroller; and when the positioning member engages with the other one of the two positioning recesses, the seat faces a rear direction of the stroller.

8. The stroller of claim 7, wherein the seat further comprises a second elastic member, and opposite ends of the second elastic member abut against the positioning member and the seat.

9. The stroller of claim 1, wherein the seat further comprises a webbing, and the webbing is disposed on an upper surface of the seat.

10. The stroller of claim 1, wherein a moving direction of each of the engaging members is perpendicular to a pressing direction of the unlock button.

* * * * *